Sept. 4, 1951  H. M. PUTMAN  2,566,369
PRESSURE GAUGE
Filed Jan. 23, 1946

Inventor
Henry M. Putman
by Potish, Cushman & Grover
Att'ys.

Patented Sept. 4, 1951

2,566,369

UNITED STATES PATENT OFFICE 2,566,369

PRESSURE GAUGE

Henry M. Putman, Boston, Mass.

Application January 23, 1946, Serial No. 642,842

4 Claims. (Cl. 201—48)

The present invention relates to a device for measuring the pressures of fluid media.

The device comprises in general a closed capillary tube containing a compressible gas in one end and a non-compressible liquid in the other end—and preferably a second liquid immiscible with the first liquid which occupies the intervening space in the capillary tube, between the gas and the other liquid. The meniscus between the two liquids in thus positioned within the capillary tube. The end of the tube in which the gas is contained is provided with rigid walls, as is also the middle portion of the capillary tube. The end of the capillary tube containing the first-mentioned liquid, however, is deformable with respect to pressures which are of the order to be observed or measured by the device.

In use, the device is completely immersed in the fluid medium, the pressure of which is to be measured. The measure of the pressure is determined by the position of one of the meniscuses of the liquids in the tube, but usually of the meniscus between the two immiscible liquids.

In one embodiment of the invention a part or all of the capillary may be made of a transparent wall material such as glass, and one of the liquids is colored or at least selectively visible against the other. Graduations are also provided on the capillary tube, by which relative positions of the meniscuses, at different degrees of pressure, may be calibrated and observed and read directly therefrom.

In a second embodiment of the invention one of the liquids, (e. g., preferably the one occupying the central portion of the capillary tube) is electrically conductive, such as mercury, and the inside surfaces of the walls of the capillary are formed of electrically conductive metal such as platinum, silver or tin. In this form of the device, electrical conductors lead into the metal surfaces of the capillary walls, at each end or in other desired spaced relation—whereby the electrical conductivity of the intervening composite column of the two liquids (or of the electrically conductive liquid and relatively non-conductive gas) will be determined by the corresponding positions of the separating meniscus between the two liquids, or of the meniscus between the liquid and the gas. Therefrom the co-related pressure, (to which the device must be subjected to cause such displacement of the deformable wall, the first liquid, the second liquid, and compression and contraction of the compressible gas—at the other end of the tube) is measured.

In a third embodiment of the invention, both of the liquids may be conductors of electricity, but of different degrees of conductivity. In this case, the composite conductivity of the columns of the two liquids contained in the capillary tube or between any two points therein may be determined by introducing two leads into the capillary tube at such two separate points (or more) and thence to the outside of the device, whereby an electric circuit may be completed—a portion of which is formed by the two conductive liquids contained between the two leads or points in the capillary tube—the meniscus separating the two liquids being between these two points. By variations in the aggregate conductivity or resistance of the liquids contained between these two points, the location of the meniscus and hence the corresponding pressure to which the device is subjected, is determined.

Typical examples of the invention and of these embodiments of the invention are illustrated in detail in the accompanying drawings, in which.

Figure 4:
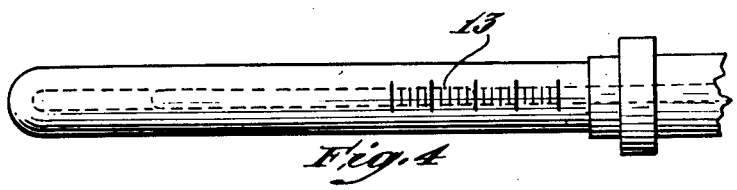
Fig. 4 is a top view, to show graduations, of the device of Fig. 1.
Figure 1:
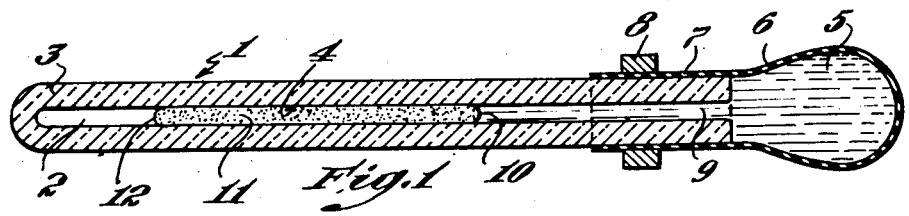
Fig. 1 is a cross-sectional view of a transparent (glass) capillary tube for direct readings.

Referring to the drawings, the device shown in Fig. 1 comprises a hermetically closed capillary tube generally indicated at 1, containing a gas 2 at one end which is completely enclosed, by a rigid wall 3, except for its continuity with the central capillary tube portion 4 whose walls are also rigid. The other end of the central portion 4 of the capillary tube 1 leads into a chamber 5 which may be somewhat enlarged. The walls 6 of the chamber 5 are deformable under the pressures to be measured by the device. The walls 6 may be of suitable metals or plastics. They are welded or otherwise sealed to the outer surfaces of the wall of the capillary tubing as at 7, or by their own elasticity or a clamping band 8, or other appropriate means.

It is, however, especially to be observed that while such sealing of the device is advisable and convenient, it is not necessary or essential to the satisfactory operation of the apparatus. Because, when the device is immersed in the medium, the pressure of which is to be determined, all parts of it are subjected to equal pressures. In consequence, if there were a minute opening in the wall of the tube—as between the wall 6 and the capillary tubing, at 7, the entire pressure would be exerted inwardly—and there would be no differential of pressure between one part of the tube and another, which would even tend to induce leakage of the fluids in the tube to the outside.

The chamber 5 is filled with a non-compressible liquid 9 which extends therefrom into the capillary tube 1 where it forms separating meniscus 10 with a column of a second liquid 11 in the central portion 4 which is immiscible therewith, and which presents, at its opposite end, a free meniscus 12, to the gas 2. The outside wall of the capillary glass tubing is provided with graduations 13 whereby the relative positions of the fluids, or their meniscuses, may be directly observed and recorded.

The operation of the device is as follows: the device is completely immersed in the fluid of which the pressure is to be measured (by reference to a preliminary known pressure by which the graduations in the tubing will have been calibrated) and is located before a window or the like in the vessel containing the fluid of unknown pressure, through which the device may be observed. All of the fluids within the gauge are instantaneously brought to the same pressure as the surrounding fluid and the compressible gas 2 changes its volume relative to the said pressure. To each pressure corresponds a certain position of the meniscus separating the two immiscible liquids (or the free meniscus 12). The position of the meniscus is spotted against the graduations and read from the outside.

Figure 2:
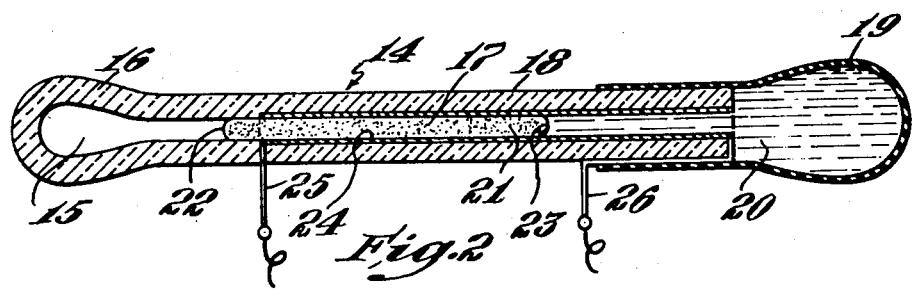
Fig. 2 is a cross-sectional view of the embodiment of the device in which the capillary wall is formed of an electrically conductive metal.

The embodiment of the device shown in Fig. 2 comprises a capillary tube 14 having a gaseous space 15 at one end, somewhat enlarged and enclosed by rigid walls 16, a central portion 17, also enclosed by rigid walls 18 and the other end portion somewhat larger and enclosed by pressure deformable walls 19 hermetically sealed to the walls 18 of the central portion. This end portion contains a liquid 20 which may or may not be a conductor of electricity, and it extends into the central portion of the capillary where it meets the second liquid 21, with which it is immiscible and hence forms the separating meniscus 23, between the two liquids. The second liquid is a conductor of electricity (especially if the first-mentioned liquid 20 is not) such as mercury, colloidal suspension of graphite, or any non-gas-forming electrically conductive liquid or the like—its opposite end forming a free meniscus 22, in contact with the gas in space 15. The inner surface of the capillary tube 14 is formed or lined with an electrically conductive surface such as a metal film or tube 24 containing the two liquids and the separating meniscus between them. Two lead-in wires are provided— 25 passing into the capillary space and contacting the metal tube or liner at one end, and 26 passing in through the capillary wall or between the capillary wall and deformable end wall and contacting with the metal tube or lining surface at the other end.

In operation of this type of device, it is completely immersed in the fluid medium of which the pressure is to be determined, and the lead-in wires 25, 26 are carried to a suitable point at which the electric circuit may be completed through suitable, well-known indicating apparatus. All of the fluids inside of the pressure gauge are thus instantaneously brought to the same pressure as the surrounding fluid and the compressible gas changes its volume according to such pressure. To each degree of pressure corresponds a certain position of the meniscus 22, or meniscus 23, and a certain definite length of the column of the electrically conductive liquid 20 or of liquids 20 and 21 in contact with the electrically conductive wall 24 of the capillary tube in which it is retained. It follows that to each pressure corresponds a definite electrical resistance of this length of the column of the conductive liquid and of the fixed resistance of the electrically conductive metal tube or wall between the lead-in wires. This resistance is a measure of the pressure to which the device or pressure gauge is subjected and is indicated or recorded at a distance by suitable well-known instruments—for example such as a Wheatstone bridge, a combination of an ammeter and a voltmeter, or the like.

Figure 3:
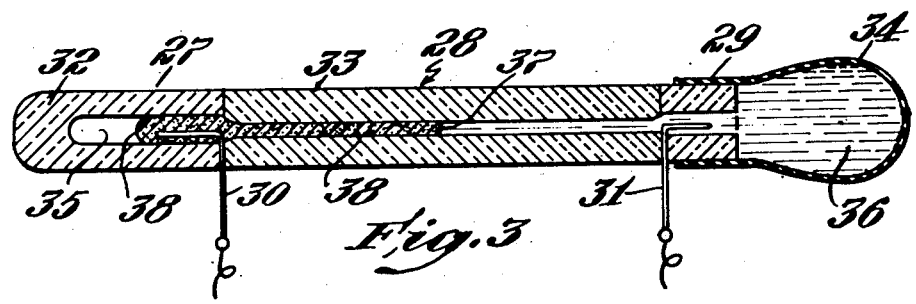
Fig. 3 is a cross-sectional view of the device in which two electrically conductive liquids are employed, with lead-in wires at separated points in the capillary tube.

The embodiment of the invention shown in Fig. 3 may be made of three sections of capillary tubing 27, 28 and 29, by sealing them together coaxially, with a lead-in wire 30 between the sections 27 and 28 and a lead-in wire 31 between the sections 28 and 29. In this arrangement the first section 27 is otherwise closed by a rigid wall 32 and the central section has a rigid wall 33 while the section 29 is hermetically sealed to an end chamber formed of a pressure deformable wall 34. As in the previous types of embodiment of the invention, the closed section 27 of the capillary contains a gas 35. The chamber formed by the deformable wall 34 is filled with an electrically conductive liquid 36, such as an electrolyte, colloidal graphite, etc. which enters the capillary tube section 29 and contacts with the lead-in wire 31, and forms a separation meniscus 37 with the second, electrically conductive liquid, immiscible with the first, such as mercury 38. The mercury column presents a free meniscus 38 to the gas 35 contained in the end of the tube and also contact with the lead-in wire 30.

In this form of the device as well as in that shown in Fig. 2, the walls of the capillary tubing may be of glass and hence both transparent and non-conductive of electricity. But since the position of the meniscus is indicated and to be determined by the electric current through the capillary column of electrical conductors, opaque non-conductive materials may be used in making the walls, such as plastics, resins and the like—or even metals, if suitably disposed and their conductivities provided for or calibrated. Transparent windows with graduations thereon may also be provided for purposes of adjustment, calibration, repair or other direct locating and reading of the meniscus position.

The operation of this form of the device is similar in all respects to the operation of the device shown in Fig. 2. The electrical resistance of the capillary column in this case is of course made up of the compound resistance of the two electrically conductive liquids, 36 and 37, which are of different conductivities, and of the variable length of each between the lead-in wires forming contact with them.

In a simpler form of construction the device may comprise a closed capillary tube having rigid walls in one portion and resilient, pressure-deformable walls in another section, and in which the rigid wall section contains a gas and the deformable wall section contains a single liquid. The free meniscus between the liquid and gas will then serve as a point of reference, and its movement in the capillary tube will constitute a measure of the degree of pressure to which the device is being subjected at any time. Such simplification is adapted to each of the modifications shown, except that in Fig. 3, in which electrical connection must be established between the lead-in wires of the circuit. But it may be effected in this case also if the gas employed is sufficiently conductive with respect to the electric potential imposed.

I claim:

1. A pressure measuring device comprising a capillary tube having electrically non-conductive walls, which is connected at one end to an otherwise closed chamber, having rigid walls, and to an otherwise closed chamber, having pressure-deformable walls, at the other end, and characterized by having a compressible gas in the rigid walled chamber, a non-gas-forming liquid in the pressure-deformable walled chamber, and an electrically conductive non-gas-forming liquid in the capillary tube, immiscible with the first liquid, the meniscus between the two liquids being within the capillary tube, and the inner surface of the capillary tube being formed of an electrically conductive metal, with electrically conductive leads passing therefrom to the outside of the device for measurement of the combined electrical conductivity of the liquids within the capillary tube, at any position of the separating meniscus between them.

2. A pressure measuring device, comprising a capillary tube, having electrically non-conductive walls, connected to an otherwise closed chamber, having rigid walls, at one end, an otherwise closed chamber, having pressure-deformable walls, at the other end, and characterized by having a compressible gas in the rigid walled chamber and an electrically conductive non-compressible non-gas-forming liquid in the pressure-deformable walled chamber, and an electrically conductive non-gas-forming liquid in the capillary tube, which is immiscible with the first liquid and of a different electrical conductivity therefrom, the separating meniscus between said liquids being within the capillary tube, electrical leads in contact with said liquids and passing through the walls of the device for the measurement of the combined electrical conductivity of the liquids within the capillary tube between the leads, corresponding to any position of the separating meniscus between them.

3. A pressure measuring device comprising a capillary tube having electrically non-conductive walls, which is connected at one end to an otherwise closed chamber, having rigid walls, and to an otherwise closed chamber, having pressure-deformable walls, at the other end, and characterized by having a compressible gas in the rigid walled chamber, a non-gas-forming liquid in the pressure-deformable walled chamber, and an electrically conductive non-gas-forming liquid in the capillary tube, immiscible with the first liquid, the meniscus between the two liquids being within the capillary tube, and the inner surface of the capillary tube being formed of an electrically conductive metal, with electrically conductive leads passing therefrom to the outside of the device for measurement of the combined electrical conductivity of the liquids within the capillary tube, at any position of the separating meniscus between them, the entire outer surfaces of the device, including the rigid walls, pressure-deformable walls and connections therebetween, being free and unobstructed, each from the other, whereby the relation of the device to the fluid, the pressure of which is to be measured, is in operation that of complete immersion in the fluid and all parts of the device are subjected to equal external pressures.

4. A pressure measuring device, comprising a capillary tube, having electrically non-conductive walls, connected to an otherwise closed chamber, having rigid walls, at one end, an otherwise closed chamber, having pressure-deformable walls, at the other end, and characterized by having a compressible gas in the rigid walled chamber and an electrically conductive non-compressible non-gas-forming liquid in the pressure-deformable walled chamber and an electrically conductive non-gas-forming liquid in the capillary tube, which is immiscible with the first liquid and of a different electrical conductivity therefrom, the separating meniscus between said liquids being within the capillary tube, electrical leads in contact with said liquids and passing through the walls of the device for the measurement of the combined electrical conductivity of the liquids within the capillary tube between the leads, corresponding to any position of the separating meniscus between them, the entire outer surfaces of the device, including the rigid walls, pressure-deformable walls and connections therebetween, being free and unobstructed each from the other, whereby the relation of the device to the fluid, the pressure of which is to be measured, is in operation that of complete immersion in the fluid and all parts of the device are subjected to equal external pressures.

HENRY M. PUTMAN.

REFERENCES CITED

The following references are of record in the file of this patent:

UNITED STATES PATENTS

| Number | Name | Date |
|---|---|---|
| 517,089 | Woodworth | Mar. 27, 1894 |
| 1,014,800 | Balderston | Jan. 16, 1912 |
| 1,055,827 | Spencer | Mar. 11, 1913 |
| 1,522,158 | Van Deventer | Jan. 6, 1925 |
| 1,583,575 | Coberly | May 4, 1926 |
| 1,588,285 | Weaver | June 8, 1926 |
| 1,692,360 | Wolcott | Nov. 20, 1928 |
| 1,942,857 | Hickman | Jan. 9, 1934 |
| 1,975,220 | Ananiew | Oct. 2, 1934 |

FOREIGN PATENTS

| Number | Country | Date |
|---|---|---|
| 2,862 | Great Britain | Dec. 9, 1853 |